United States Patent [19]

Graves

[11] Patent Number: 5,004,005

[45] Date of Patent: * Apr. 2, 1991

[54] COMBINATION VALVE

[76] Inventor: John G. Graves, 3107 Woodward Blvd., Tulsa, Okla. 74105

[*] Notice: The portion of the term of this patent subsequent to May 29, 2007 has been disclaimed.

[21] Appl. No.: 506,101

[22] Filed: Apr. 9, 1990

Related U.S. Application Data

[63] Continuation-in-part of Ser. No. 390,279, Aug. 7, 1989, Pat. No. 4,928,725.

[51] Int. Cl.$^5$ .................... F16K 5/06; F16K 15/03; F16K 15/04
[52] U.S. Cl. .................. 137/269.5; 137/584; 137/614.17; 251/192
[58] Field of Search ............... 137/269.5, 584, 614.17; 251/192

[56] References Cited

U.S. PATENT DOCUMENTS

| | | | |
|---|---|---|---|
| 500,944 | 7/1893 | Pickel | 137/269.5 X |
| 1,019,590 | 3/1912 | Beck | 137/269.5 |
| 1,175,328 | 3/1916 | Wright | 137/614.17 |
| 1,238,664 | 8/1917 | Groom | 137/269.5 |
| 2,151,098 | 3/1939 | Greenwood | 277/23 |
| 2,589,176 | 3/1952 | Wheatley | 251/123 |
| 3,344,808 | 10/1967 | Cary | 137/599.2 |
| 3,348,569 | 10/1967 | Frye | 137/269.5 |
| 3,363,650 | 1/1968 | Scaramucci | 137/614.17 |
| 3,474,818 | 10/1969 | Hartman | 137/614.17 |
| 3,565,099 | 2/1971 | Huber | 137/269.5 |
| 3,851,665 | 12/1974 | Coughlin | 137/614.17 |
| 4,928,725 | 5/1990 | Graves | 137/269.5 |

Primary Examiner—Robert G. Nilson
Attorney, Agent, or Firm—Mark G. Kachigian

[57] ABSTRACT

A combination valve formed of a valve body having a flow passageway therethrough and an opening in the top communicating with the passageway. A rotating member is received in the body, within the flow passageway, the rotating member having a flow passageway therethrough which is alignable with the passageway in the body and having a top opening therein communicating with the passageway through the rotating member. A checking mechanism is supported within the rotating member and moveable from a closed position blocking the passageway therethrough to an open position. A bonnet removably closes the body top opening. A stem is rotatably received in the bonnet having the inner end connected to the rotating member, the member thereby rotatable to permit the flow of fluid in one direction, the checking mechanism blocking fluid flow in the opposite direction, and by rotating the member to permit the flow of fluid in the second direction, the checking mechanism blocks flow in the first direction and wherein the rotating mechanism may be rotated to a third position wherein fluid flow is blocked in either direction and in which the bonnet may be removed to provide access to the interior of the valve and the interior of the rotating member whereby the checking mechanism may be removed and replaced when the valve is in the closed position and subject to fluid pressure.

12 Claims, 10 Drawing Sheets

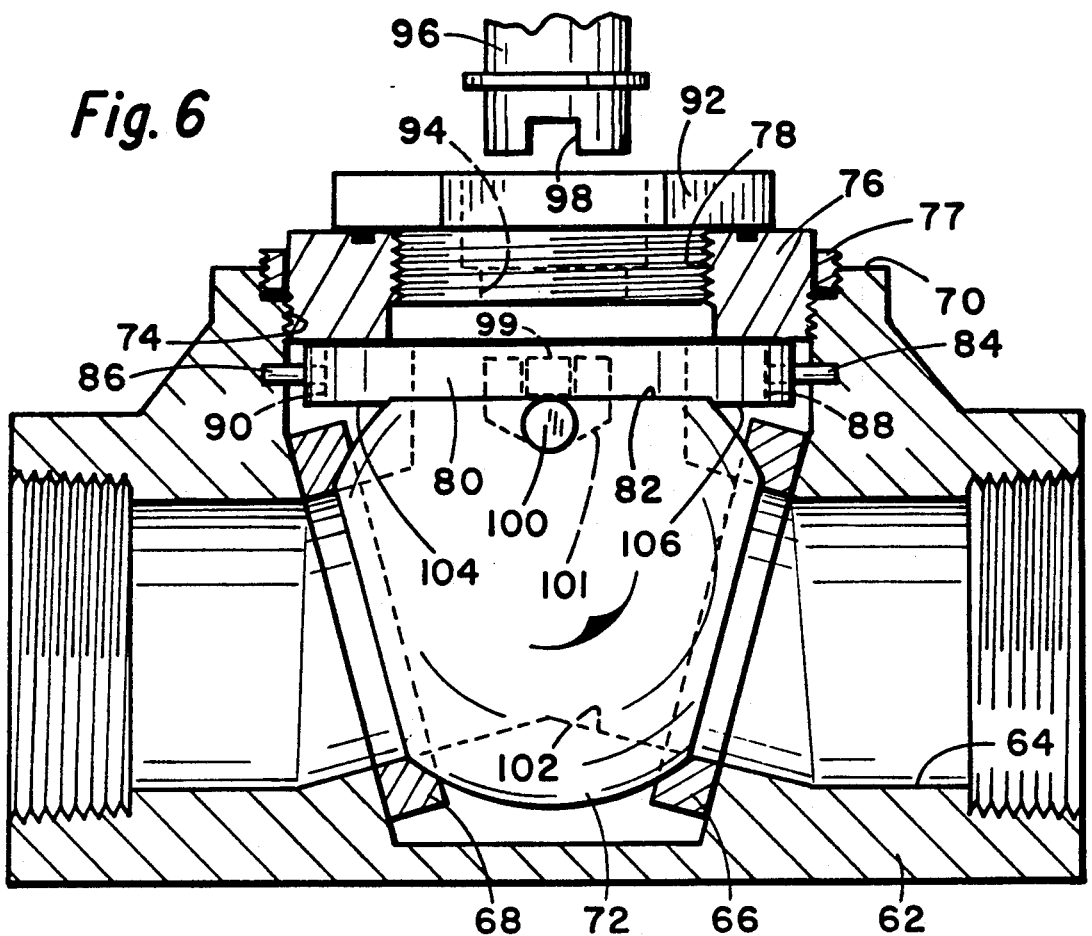
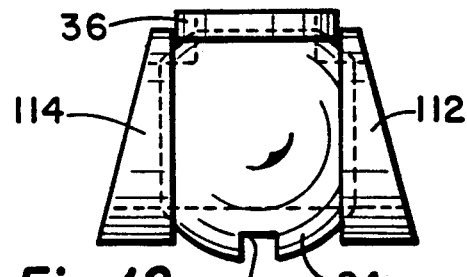
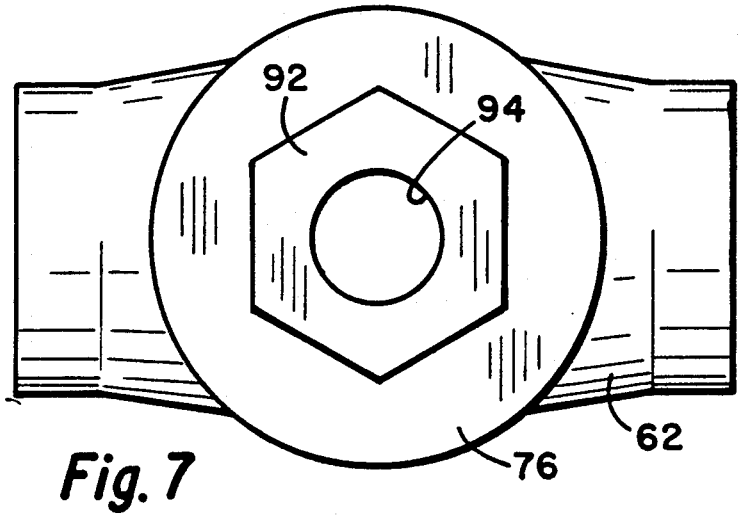
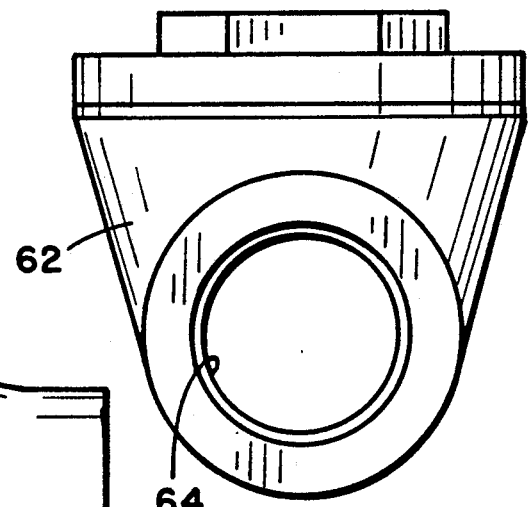

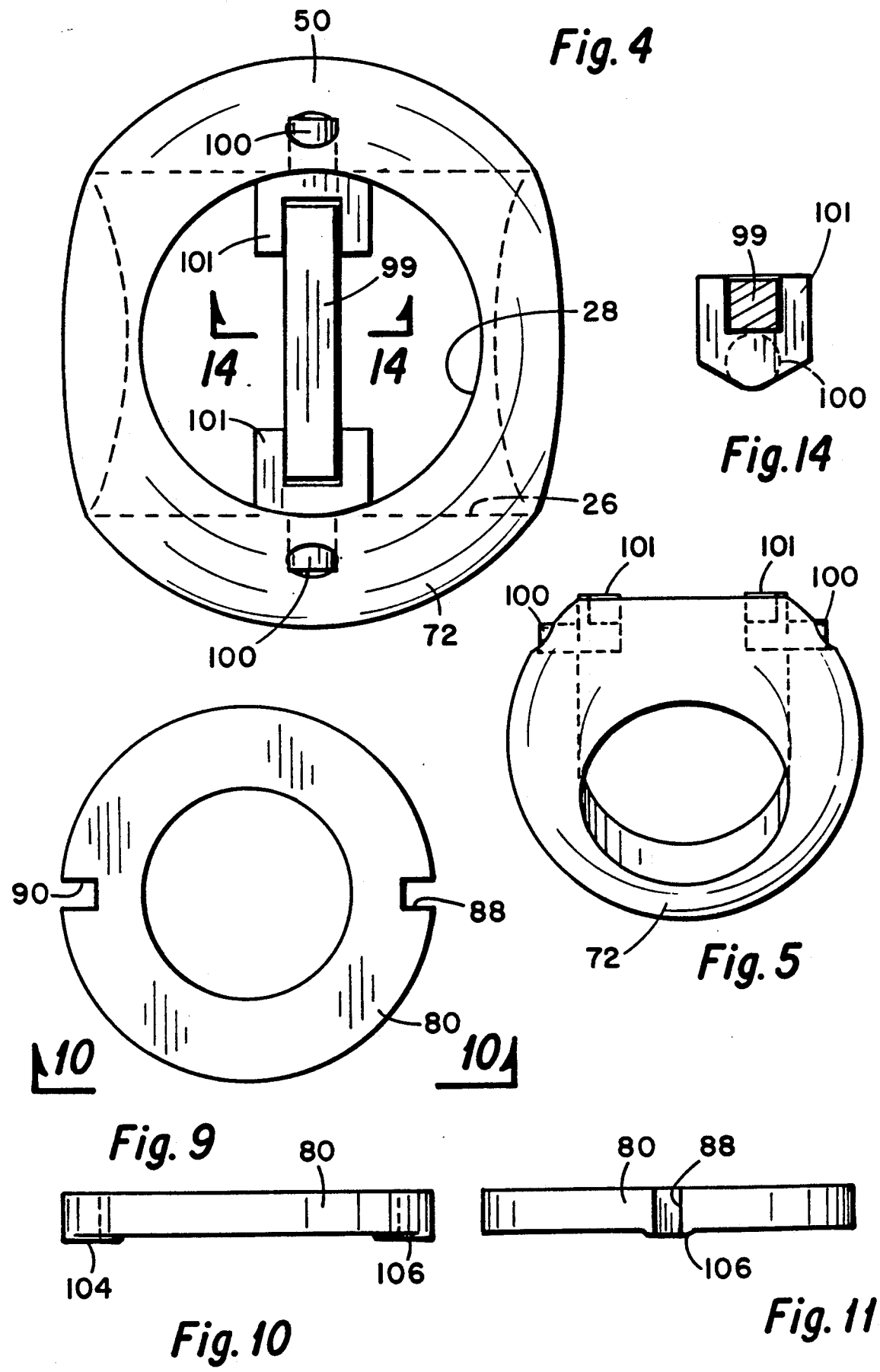

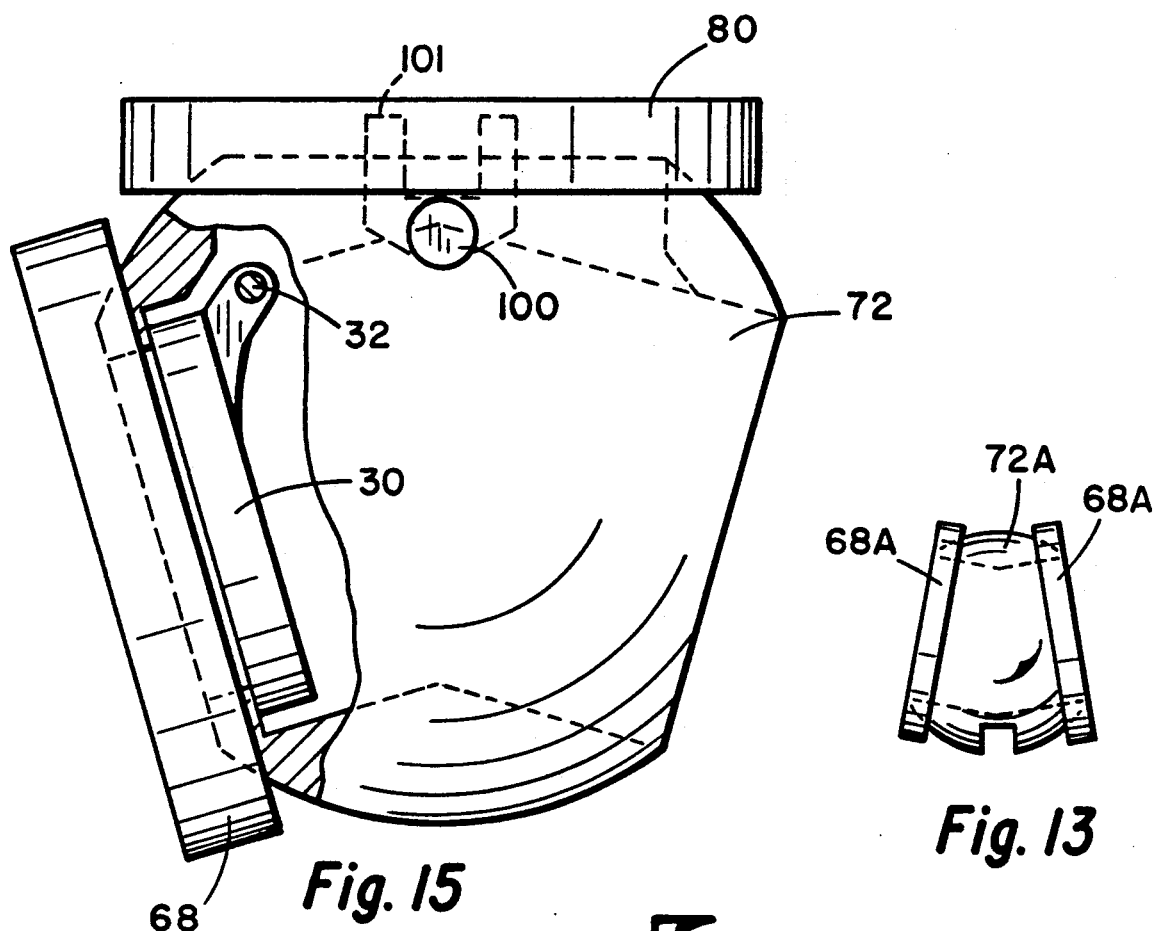
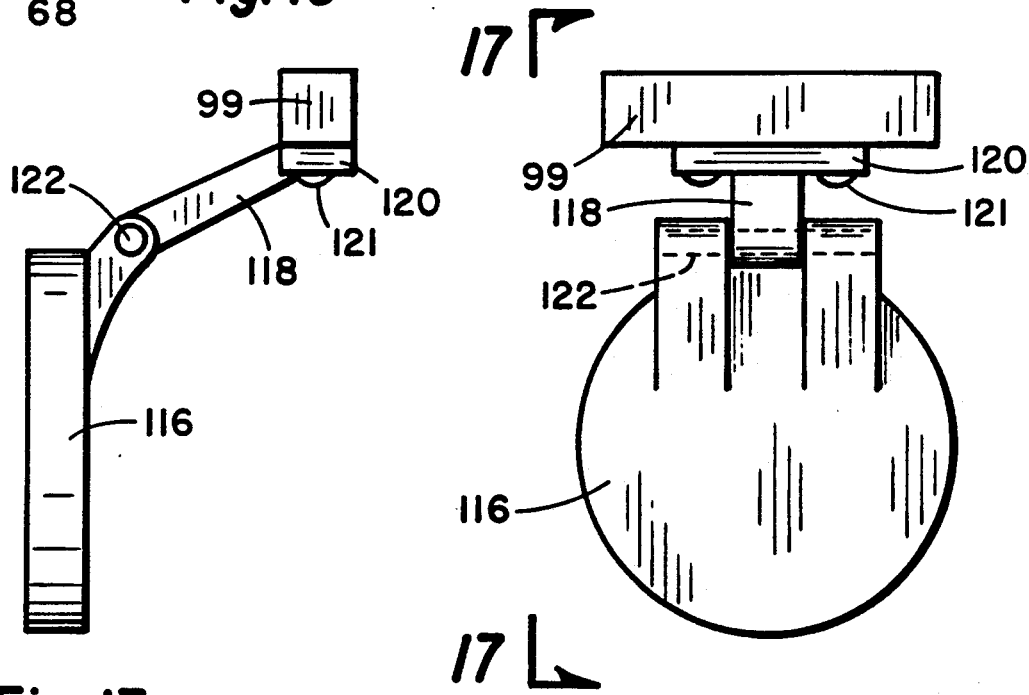
Fig. 15
Fig. 13
Fig. 17
Fig. 16

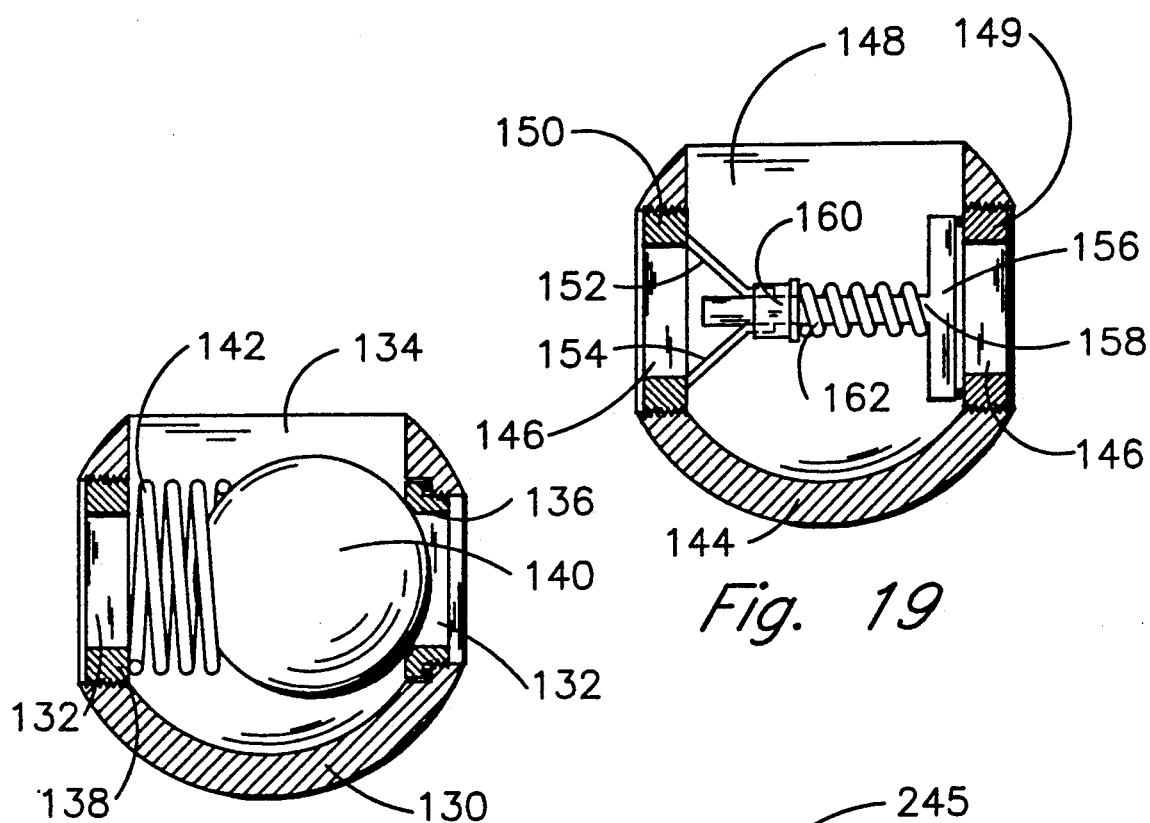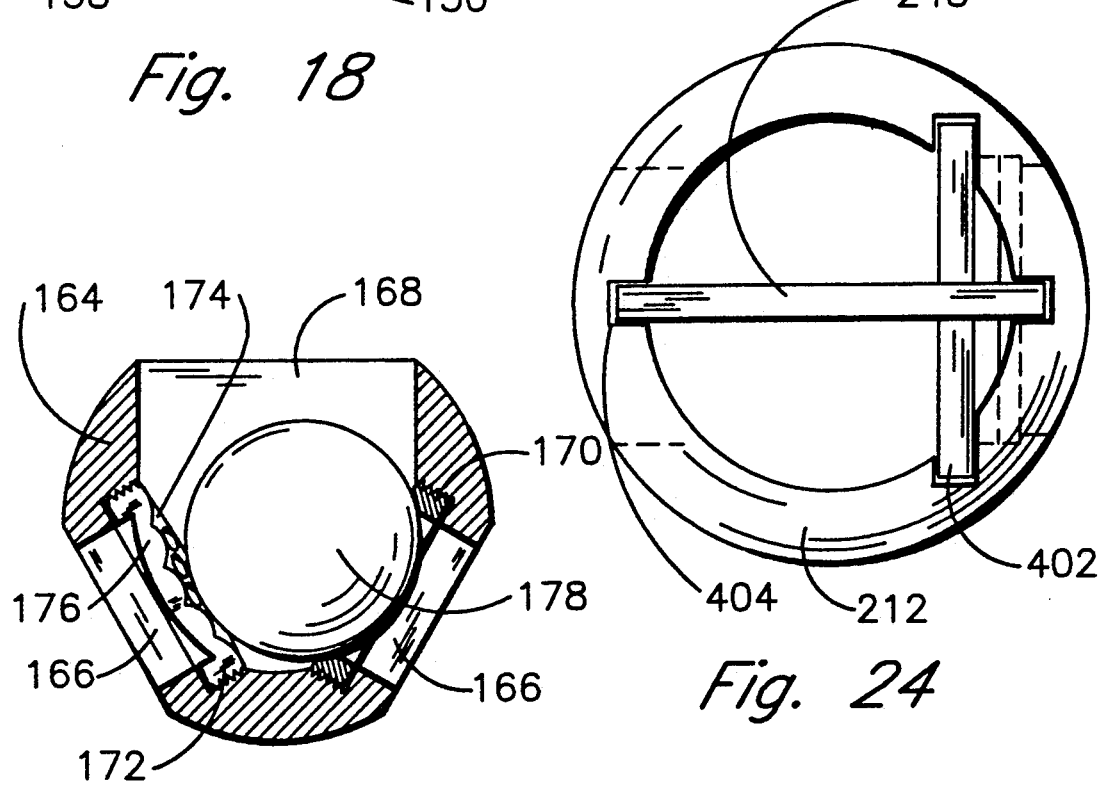

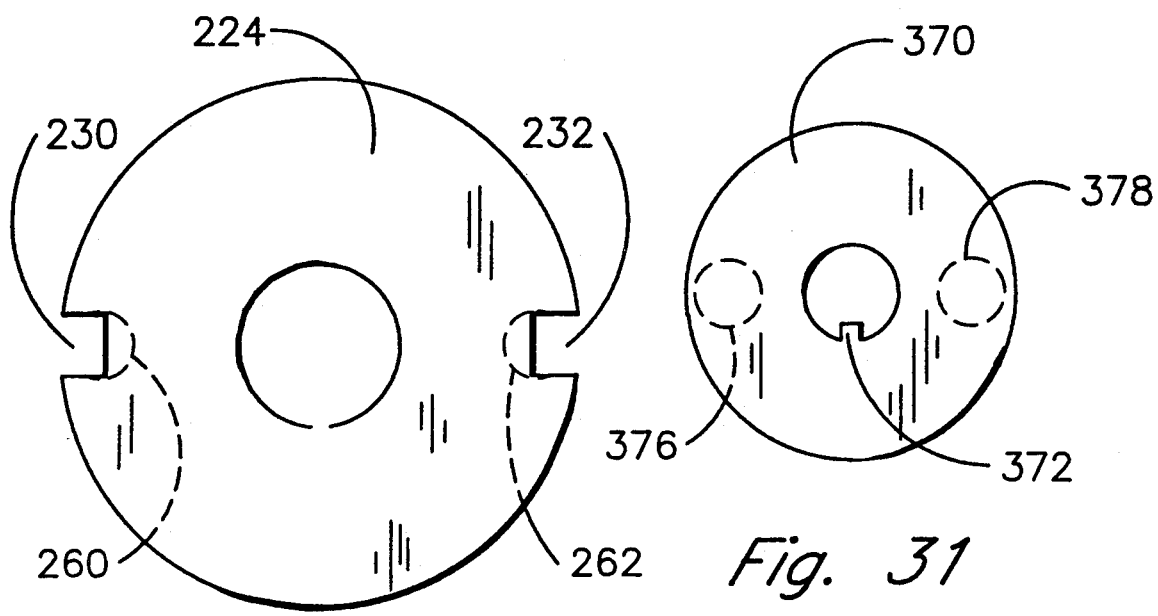
Fig. 29
Fig. 31
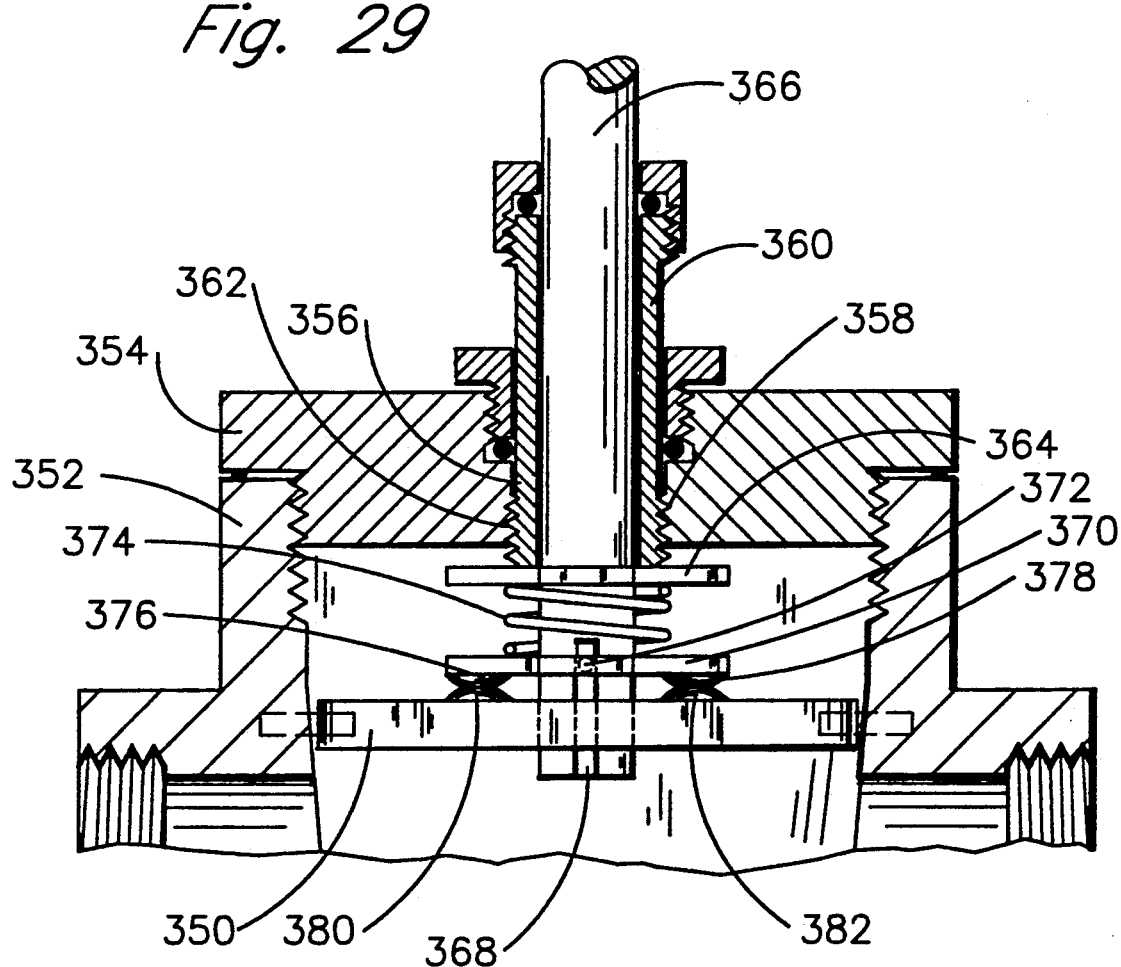
Fig. 30

COMBINATION VALVE

RELATIONSHIP TO OTHER APPLICATIONS

This is a continuation-in-part of application Ser. No. 07/390,279 filed Aug. 7, 1989 entitled "Combination Plug and Check Valve", now U.S. Pat. No. 4,928,725.

BACKGROUND OF THE INVENTION

The use of rotatable valves is well known as is the use of check valves which include a mechanism for stopping the flow of fluid in one direction while permitting it in another direction. Check valves normally are unidirectional, that is, permit flow in one direction and block flow in the other direction, and there is no means of reversing this condition without completely removing the valve from its installation and reversing the orientation of the valve.

Others have provided check valves in which the check action of the valve can be reversed. In one condition, the valve permits flow in a first direction while prohibiting flow in the second direction; The internal orientation of the valve can be reversed so that the valve then permits flow in the second direction while preventing flow in the first direction. For reference to prior art relating to such reversible check valves, reference may be had to the following U.S. Pat. Nos. 3,851,665; 3,474,818; 3,363,650; 1,175,328; 2,151,098; and 3,344,808.

These prior art devices disclose useful basic concepts, but each of the valves shown in these designs have inherent problems. One problem which frequently exists with check valves is that after a period of usage, the pivotal mechanism within the valve which functions to permit flow in one direction while blocking it in the other, can become worn, and wear is usually accelerated by the erosion of fluid flow through the valve. In addition, many check valves have elastomeric seats to obtain complete closure. These elastomeric seats can deteriorate. For these and other reasons it is sometimes necessary that the checking mechanism be removed for repair or replacement. In check valves of the known type, all fluid pressure to the valve must be shut-off, otherwise when the valve is open for repair, leakage of fluid is permitted.

The present disclosure is directed towards a valve which provides a check action in either direction, selectable by the user of the valve, and which provides complete fluid flow shut-off when desired. The valve, thus, will replace a number of separate valves and fittings. In addition to these features, it provides a valve in which the checking mechanism may be removed for repair or replacement while the valve is under fluid pressure and without permitting leakage of fluid.

The present disclosure is also directed towards a mechanism for use in valves that will automatically increase the sealing force of the rotating member when the valve is in the fully closed position and reduce the sealing force when the rotating member is in any other position, thereby providing a valve with its greatest sealing force when required and reduced wear. Additionally, the sealing force may be adjusted while the valve is under fluid pressure.

SUMMARY OF THE INVENTION

The combination valve includes a valve body having a flow passageway through it. The valve body may be connected to other fluid flow members, such as piping or the like, and this can be accomplished such as by threaded openings in each end of the valve body although the valve may be provided with integral flanges or other means of attachment which are well known in the industry. The valve body has an opening in the top which communicates with the internal passageway within the body.

A rotating member is received within the flow passageway of the body. The rotating member has a flow passageway through it which is alignable by positioning the rotating member with the flow passageway in the body. The rotating member also has a top opening which communicates with the passageway.

A checking mechanism is supported within the rotating member, and moveable by fluid flow between a closed position which blocks the flow passageway through the rotating member and an open position permitting flow through the rotating member.

A bonnet is removably secured to the valve body closing the body top opening. The bonnet has a smaller diameter opening through it. A stem is rotatably positioned within the bonnet smaller diameter opening. The inner end of the stem within the valve body is removably affixed to the rotating member.

A handle or disc may be affixed to the stem externally of the valve body to permit rotation of the stem and thereby the rotating member within the valve.

The rotating member is thereby rotatable to a first position wherein the passageway therethrough is aligned with the flow passageway through the body, and fluid flow is permitted in one direction, the checking mechanism blocking flow in the other direction. The rotating member may then be rotated 180 degrees to permit flow of fluid in the second direction, but the checking mechanism blocks fluid flow in the first direction.

The rotating member may be rotated to a third position in which the fluid flow through the valve is blocked in both directions. In the third position, the bonnet, or at least a portion thereof, may be removed exposing the interior of the rotating member. In this condition, the checking mechanism may be removed from the interior of the rotating member to be repaired or replaced. This is possible even when the valve is under fluid pressure.

The improved combination valve of this disclosure thereby provides a valve which has multiple fluid control positions but which is also repairable without removing the valve body from its connection with other fluid carrying components and while the valve is under fluid pressure.

Another feature of this disclosure is the provision of improved sealing contact between the rotating member and the valve body fluid passageway. In one arrangement, seats are provided in the valve body that are inclined towards each other in a direction away from the top opening. The seats are free to move with respect to the valve body. In the closed position, the downward force applied against the rotating member increases and the seats are thereby displaced in the direction toward each other, achieving additional sealing contact between the rotating member and the seats.

Another feature of this invention includes a top seal and provision is made for increasing the pressure of the rotating member against the top seal when the rotating member is in the third or total fluid flow closed position. A non-rotatable, vertically moveable disc or ring is received in the valve body above and in contact with the rotating member. The disc is 15 provided with increased thickness portions that cooperate with opposing portions on the rotating member.

BRIEF DESCRIPTION OF THE DRAWINGS

FIG. 4 is an enlarged top plan view of a rotating member of the type employed in the valve of FIG. 6.

FIG. 5 is a reduced scale isometric view of the rotating member shown in FIG. 4 employed in the valve of FIG. 6.

FIG. 6 is an elevational cross-sectional view of an alternate, second embodiment of the invention including improved means of maintaining force of the rotating member against the valve seats.

FIG. 7 is an external top plan view of the valve shown in FIG. 6.

FIG. 8 is an external end view of the valve of FIG. 6, both FIGS. 7 and 8 being shown in reduced scale.

FIG. 9 is a top plan view of a top seal employed in the valve of FIG. 6.

FIG. 10 is an elevational view taken along line 10—10 of FIG. 9.

FIG. 11 is an elevational view of the top seal as shown in FIG. 10 with the seal rotated 90 degrees.

FIG. 12 is a fragmentary external view of the rotating member, top seal and valve seats such as may be employed in the valve in FIG. 1 in which the seats are of a triangular cross sectional design for improved sealing contact between the rotating member and the valve seats.

FIG. 13 is an elevational view, in reduced scale, of an alternate arrangement of the valve in which the seats are inclined towards each other in the upward direction.

FIG. 14 is a partial cross-sectional view taken along line 14—14 of FIG. 4 showing details of the pin supports.

FIG. 15 is an elevational external view of the rotating member as employed in the valve of FIG. 6, showing one seat and the top seal, and showing a closure disc mounted pivotally within the rotating member.

FIG. 16 is an end view of a closure disc having an alternate means of pivotally supporting the disc within the rotating member in which the disc is supported from the rotation control pin.

FIG. 17 is a side view of the closure disc taken along line 17—17 of FIG. 16.

FIG. 18 is a partial sectional view of a rotating member having an alternate checking mechanism in the form of a ball and seat arrangement for use with the valve shown in FIG. 1.

FIG. 19 is a partial sectional view of a rotating member having an alternate checking mechanism in the form of a poppet arrangement for use with a valve shown in FIG. 1.

FIG. 20 is a partial sectional view of a rotating member having an alternate checking mechanism in the form of a ball and seat arrangement for use with the valve shown in FIG. 6.

FIG. 24 is a top view of a rotating member having the checking mechanism in the form of a clapper arrangement as shown in FIG. 23.

FIG. 29 is a top plan view of the non-rotatable disc of FIG. 21.

FIG. 30 is a sectional view of another embodiment of a variable sealing force mechanism for use with the valves in FIGS. 21 or 21A.

FIG. 31 is a top plan view of the additional disc used in FIG. 30.

DETAILED DESCRIPTION OF THE PREFERRED EMBODIMENTS

Figure 1:
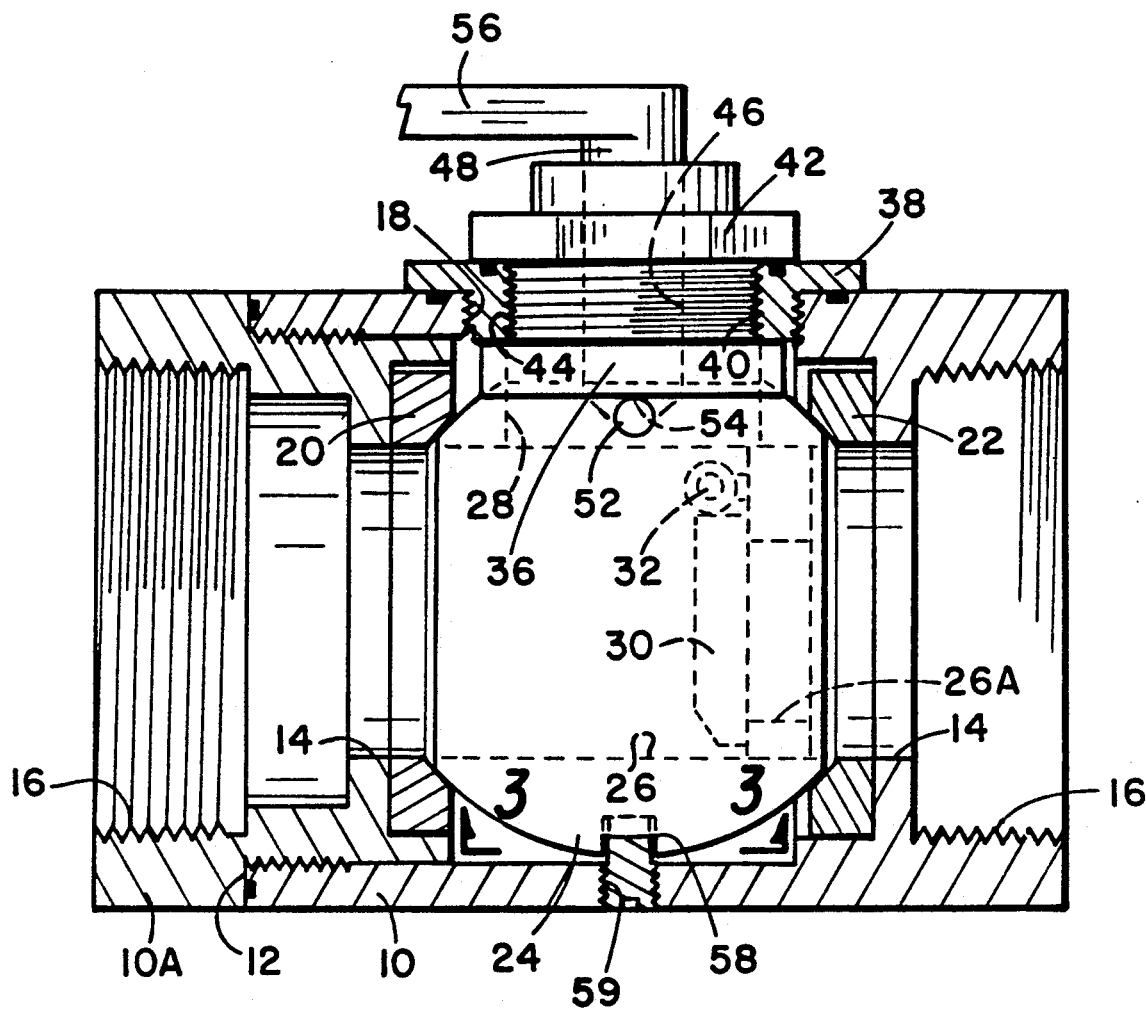
FIG. 1 is an elevational cross-sectional view of a first embodiment of the valve of this disclosure providing a combination valve having means for access to the checking mechanism without removing the valve from fluid pressure.

Referring to the drawings and first to FIG. 1, a valve which exemplifies the principles of this disclosure is shown. The valve is formed of a body made up of two threaded portions. A first body portion 10 has a threaded end 12 which receives an externally threaded portion of a second body portion 10A. With the portions 10 and 10A threadably secured to each other, a total valve body is formed having a flow passageway 14 therethrough. The valve body made up of portions 10 and 10A is provided with means for connection to other fluid flow conducting members, such as by the provision of internal threads 16 at each end of the valve body.

Formed in the top of the valve is a top entry 18 which provides communication to the flow passageway 14 within the valve 15 body. The top opening 18 is internally threaded in the arrangement of FIG. 1.

Positioned within the valve body is a first seat member 20 and a second seat member 22. The seats 20 and 22 are spaced apart from each other and are positioned so that they can slide vertically with respect to the body 10 and 10A.

Positioned within the valve body flow passageway 14 and between seats 20 and 22 is a rotating member 24. The rotating member may take the form of a ball, a cylinder or a modified version of either of these. As shown in FIG. 1, the member 24 has a generally spherical external surface and has a flow passageway 26 through it. The external spherical surface is in sealed contact with seats 20 and 22.

Rotating member 24 has a top opening 28 which provides communication with the flow passageway 26.

The interior of rotating member 24 is configured so that one portion 26A of the flow passageway is of reduced diameter. Positioned within the interior of rotating member 24, that is, within the flow passageway 26, is a checking mechanism. In the embodiment shown in FIG. 1, this takes the form of a clapper 30 which is pivotally supported to the rotating member and pivotal about a pin 32. When the clapper 30 is in the closed position as shown in FIG. 1, the reduced diameter portion 26A of the flow passageway is closed.

Figure 2:
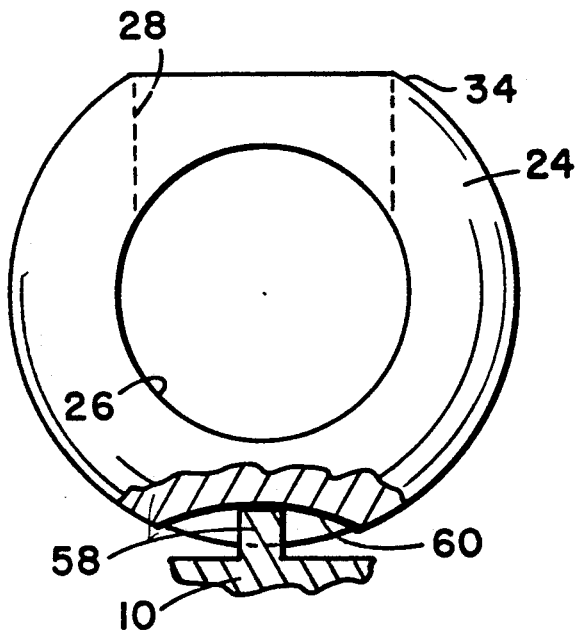
FIG. 2 is a fragmentary elevational view of the rotating member and a small portion of the valve body, the rotating member being forced upwardly for increased sealing contact with the upper seal when the rotating member is in the fully closed position.

Rotating member 24 has a spherical upper sealing surface 34, as shown in FIG. 2. A top seal 36 is positioned within the valve body and in engagement with the upper surface 34.

The top entry 18 of the valve body is closed by an outer bonnet member 38 which is externally threaded to engage the body threaded opening 18. The outer bonnet 38 has an internally threaded opening 40 therein. The outer bonnet member 38, thus, is annular in shape and engages the top seal 36.

An inner bonnet member 42 having external threads 44 is positioned within the outer bonnet member threaded opening 40. The inner bonnet member 42 has a reduced diameter opening 46 therethrough which rotatably receives a stem 48. The inner end of the stem 48 is attached to the rotating member about its axis of rotation. The rotating member 24 has a pin 52 in the top portion thereof. The lower end of stem 48 has a recess 54. This recess engages pin 52 so that when stem 48 is rotated force is applied by way of pin 52 to rotate the member 24. A handle 56 shown fragmentarily in FIG. 1 is used to rotate stem 48 and thereby position the rotating member 24.

With the rotating member 24 oriented as in FIG. 1, fluid can flow through the flow passageway 14 in a first direction, that is, from right to left. Such fluid flow would lift clapper 30 from sealed engagement with its seat within the rotating member 24. Flow is not permitted in the reverse direction, that is, from left to right. However, if the ball 24 is rotated 180 degrees then the clapper 30 would permit fluid flow from left to right but would block fluid flow in the opposite direction. In addition, the rotating member 24 may be rotated 90 degrees to a third position wherein the body passageway 14 is blocked against fluid flow in either direction. In such third position, the clapper 30 is not involved in the action of the valve.

In such third position, it can be seen that the inner bonnet member 42 may be threadably removed. This action will result in exposure of the interior of the rotating member 24. The clapper 30 may then be removed, such as by removing pin 32, and the clapper repaired or replaced as necessary. This can be accomplished even when the other fluid carrying components normally connected to the valve body are under fluid pressure. Thus, the valve described with reference to FIG. 1 provides a valve having three functions, that is, a check valve in a first direction, a check valve in a second direction, and a plug valve. These three functions are provided in a valve in which the checking mechanism can be removed and replaced while the valve is subject to fluid pressure.

Figure 3:
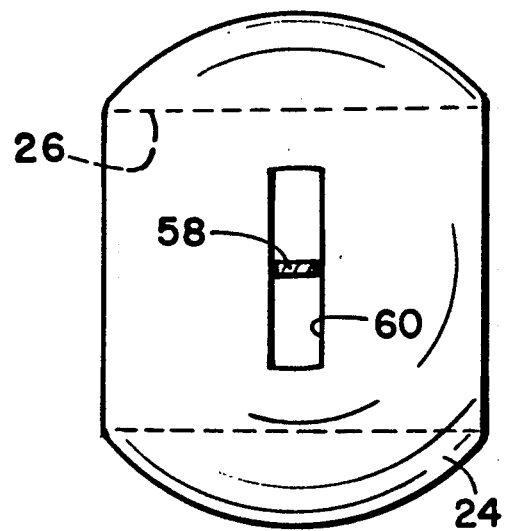
FIG. 3 is a cross-sectional view taken along line 3—3 of FIG. 1.

When the valve is in the fully closed position, that is, rotated 90 degrees relative to that of FIG. 1, and the inner bonnet 42 is to be removed to permit repair or replacement of the clapper 30, it is important that good contact be maintained between the rotating member and the top seal 36. One means of insuring this function is illustrated in FIGS. 1, 2 and 3. Positioned within the body 10 is an upstanding trunnion member 58 which is of rectangular cross-sectional configuration. Formed in the bottom of rotating member 24 is an arcuate slot 60. The width of the slot is slightly greater than the cross-sectional length of the trunnion member. When the rotating member 24 is in the position shown in FIG. 1, the top of trunnion 58 is perpendicular to the length of slot 60, but when the rotating member is rotated 90 degrees to the position shown in FIG. 2, the length of the cross-section of trunnion 58 is parallel to that of the arcuate slot 60. Because of the arcuate shape of slot 60 and the rectangular cross-sectional shape of trunnion 58 in the orientation of FIG. 2, the rotating member is slightly upwardly displaced. This slight upward displacement applies increased contact and force against the top seal 36 when the rotating member is in the fully closed position.

In FIG. 1, the trunnion member 58 is in the form of an externally threaded member received in a threaded opening 59 in the valve body. The threaded member has a screw driver slot therein by which it can be rotated thereby permitting adjustment of the rotating member 24 within the valve body to adjust for sealing contact of the rotating member with upper seal 36. As will be described herein, the threaded trunnion member 58 can be even more advantageously employed with the concepts of FIGS. 12 and 13 in which upward adjustment of the trunnion member will increase sealing contact between the rotating member and the flow control seals.

FIG. 18 illustrates another checking mechanism in a rotating member as may be employed in the valve of FIG. 1. A rotating member 130 is provided with a flow passageway 132. The rotating member 130 has a top opening 134. Threadably secured in one end of the flow passageway 132 is a seat 136. Threadably secured in the opposite end of the flow passageway 132 is a spring retainer 138. Placed between the seat 136 and the retainer 138 is a checking ball 140 and a spring 142. When the rotating member 130 has been provided with these devices and is employed in the valve of FIG. 1, fluid flow through the valve would be allowed and prohibited in the same manner as previously described, that is fluid flow would be allowed in one direction only.

Should the seat 136, the checking ball 140 or spring 142 require repair or replacement, the rotating member 130 may be rotated to close the valve of FIG. 1. The bonnet 42 (not shown in FIG. 18) may then be removed, thereby allowing the removal of the ball 140 and the spring 142 through the top opening 134. The seat 136 may also be removed by the employment of a ratchet-type tool (not shown) inserted through the bonnet opening 40 which may engage and then unscrew the seat 136.

FIG. 19 illustrates yet another embodiment of a rotatable member provided with a fluid flow checking mechanism provided for the valve of FIG. 1. A rotatable member 144 is provided with a fluid passageway 146 and a top opening 148. A valve seat 149 is threadably secured in one end of the passageway 146. A stem guide 150 is threadably secured in the other end of the flow passageway 146. The guide 150 is provided with a pair of integral arms 152 and 154. A valve 156 is provided with a stem 158 which is slideably received between the arms 152 and 154. A keeper 160, which is substantially tubular, is slideably positioned on the stem 158. A spring 162, Compressed between the valve 156 and the keeper 160, serves to maintain the valve 156 against the seat 150 until fluid pressure overcomes the spring force. The spring 162 also serves to maintain the keeper 160 in the position shown thereby maintaining the arms 152 and 154 in the position shown. The rotating member 144 provided may be employed in the valve of FIG. 1 thereby providing another embodiment of a combination plug and two-way check valve.

Should the components within the rotating member 144 require servicing, access may be obtained in the same manner as previously described. Thence, the keeper 160 may be slideably forced towards the valve 156 which allows the stem 158 to be moved out of engagement with the arms 152 and 154, thereby allowing the valve 156, the stem 158, the spring 162 and the keeper 160 to be removed through the top opening 148. The seat 150 may also be removed in the same manner as the seat 136 of FIG. 18.

FIG. 6 shows a second, alternate embodiment of the invention in which the body 62 is formed of one piece with the flow passageway through it. In this embodiment the first seat 66 and the second seat 68 are inclined towards each other in the direction away from the body upper open end 70. The seats 66 and 68 are free to slide with respect to the valve body. Rotating member 72, which has a generally spherical exterior surface, is positioned within the valve body and between seat 66 and seat 68. Due to the inclined arrangement of seat 66 and seat 68, downward force on rotating member 72 will cause sealing contact between the external spherical surface thereof and seats 66 and 68 to increase.

The body has internal threads 74 which receive the external threaded outer bonnet member 76. An annular threaded seal ring 77 is used to insure leakproof closure of the outer bonnet 76 relative to the valve body 62. The outer bonnet member has an internal threaded opening 78 therein. The outer bonnet member 76 is annular in construction. The lower end of the outer bonnet engages a top seal 80 which, in turn, engages the upper surface 82 of rotating member 72. As the outer bonnet 76 is tightened applying force on top seal 80, downward force is supplied against rotating member 72 which attains increased sealing contact between the external surface and seats 66 and 68.

To prevent the rotation of top seal 80, pins 84 and 86 extend from the valve body 62 and are slideably received in slots 88 and 90 in the top seal (See FIG. 9).

The top of the valve is closed by an inner bonnet member 92 which, as described with reference to FIG. 1, has a reduced diameter opening 94 sealably and rotatably receiving a stem 96. The lower end of stem 96 has a slot 98 which removably contacts a rotation pin 99 in the rotating member 72 so that by rotation of stem 96 the rotating member 72 is rotatably positioned.

In the arrangement of FIG. 6, if fluid pressure in the line to which the valve is attached is removed, the outer bonnet 76 can be removed, after which all interior parts of the valve, including rotating member 72 and seats 66 and 68, can be removed for repair or replacement without removing the valve body from the line.

Increased force between the rotating member 72 and seats 66 and 68 is desirable when rotating member 72 is rotated to the closed position, that is wherein the flow passageway 102 is out of alignment with the valve body flow passageway 64. For this reason the top seal 80 is provided with increased thickness portions 104 and 106 at opposite points on the seal, as best seen in FIGS. 10 and 11. These increased thickness portions 104 and 106 match with pin portions 100 of the pin supports 101 when the rotating member is in the closed position. This affect is achieved by the pins 100 extending exteriorly of rotating member 72 as shown in FIG. 5. Thus, when the rotating member 72 is rotated to the fully closed position, it is displaced downwardly, thereby increasing the sealing contact with the seats 66 and 68 to obtain a tighter seal when required, and decreasing the force in all other positions, thereby reducing wear and extending the life of the valve.

FIGS. 4 and 5 show the arrangement of the rotating member 24 with an offset fluid bore and without the internal clapper 30 since the basic concepts of the valve may be employed either as a double acting check valve, or as an improved plug valve with the rotating member of the type shown in FIG. 4 and 5 being employed when the valve functions only as a plug valve. It can be seen that the pivotal checking mechanism 30 as shown in FIG. 1 may be employed within the ball as shown in FIGS. 4 and 5 when desired.

FIG. 12 shows diagrammatically a means of utilizing the elevational displacement of the rotating member 24 of FIG. 1 achieved by the trunnion member 58 to increase sealing contact between the ball and seats. Seats 112 and 114 are, in cross-section, of trapezoidal shape. These seats have outer inclined surfaces which match correspondingly inclined surfaces (not shown) in the valve body. Seats 112 and 114 are free to slide within the valve body so that when the ball 24 is urged upwardly, increased sealing contact is attained between the external spherical surface of the ball and seats 112 and 114. This feature also has the advantage of keeping sealing force to a minimum except when the valve is "closed", resulting in less seal wear and easier operation.

FIG. 13 shows an alternate arrangement of the valve wherein the seals 66A and 68A are inclined toward each other in the upward direction toward the top of the rotating member.

FIG. 15 shows an arrangement for pivotally supporting clapper member 30 within the rotating member 72 which has a diverted pathway therethrough and which is useable with inclined seats 68 (only one of which is shown). The clapper pivots about pin 32.

FIGS. 16 and 17 show an alternate manner of supporting a clapper member 116 in the valve rotating member as compared to the arrangement of FIG. 15. The clapper 116 is pivoted to an arm 118 by a hinge pin 122. The arm 118 has an integral flat portion 120 which attaches to the bottom surface of ball control pin 99 by means of bolts 121. In this manner, when the valve of FIG. 6 is closed, the inner bonnet portion 92 may be removed, exposing the open top of ball 72. This assumes that the valve of FIG. 6 is equipped with the check valve feature of FIG. 15. The ball control pin 99 may then be lifted out, bringing with it clapper 116 so the clapper can be repaired or replaced.

FIG. 20 illustrates another embodiment of a rotatable member 164 provided with a checking mechanism utilizing a ball positioned between seats that are inclined towards each other in a direction away from the top of the rotating member as employed in the valve of FIG.

6. A rotatable member 164 is provided with a fluid passageway 166 and a top opening 168. Threadably secured in one end of the passageway 166 is a valve seat 170. Threadably secured in the other end of the fluid passageway is a retainer 172. The retainer 172 is provided with a concave surface 174, and a plurality of fluid passages 176. A checking ball 178 is provided that rests upon the seat 170 and thereby prevents the flow of fluid from left to right. Should fluid pressure to the right of the checking ball 178 exceed the pressure within the rotatable member 164, the checking ball 178 moves away from the seat 170, thereby allowing flow from right to left. The seat 170, the retainer 172 and the checking ball 178 may be replaced, as previously described, through the top opening 168, while the valve is in the closed position with fluid pressure on either side of the valve.

Figure 21A:
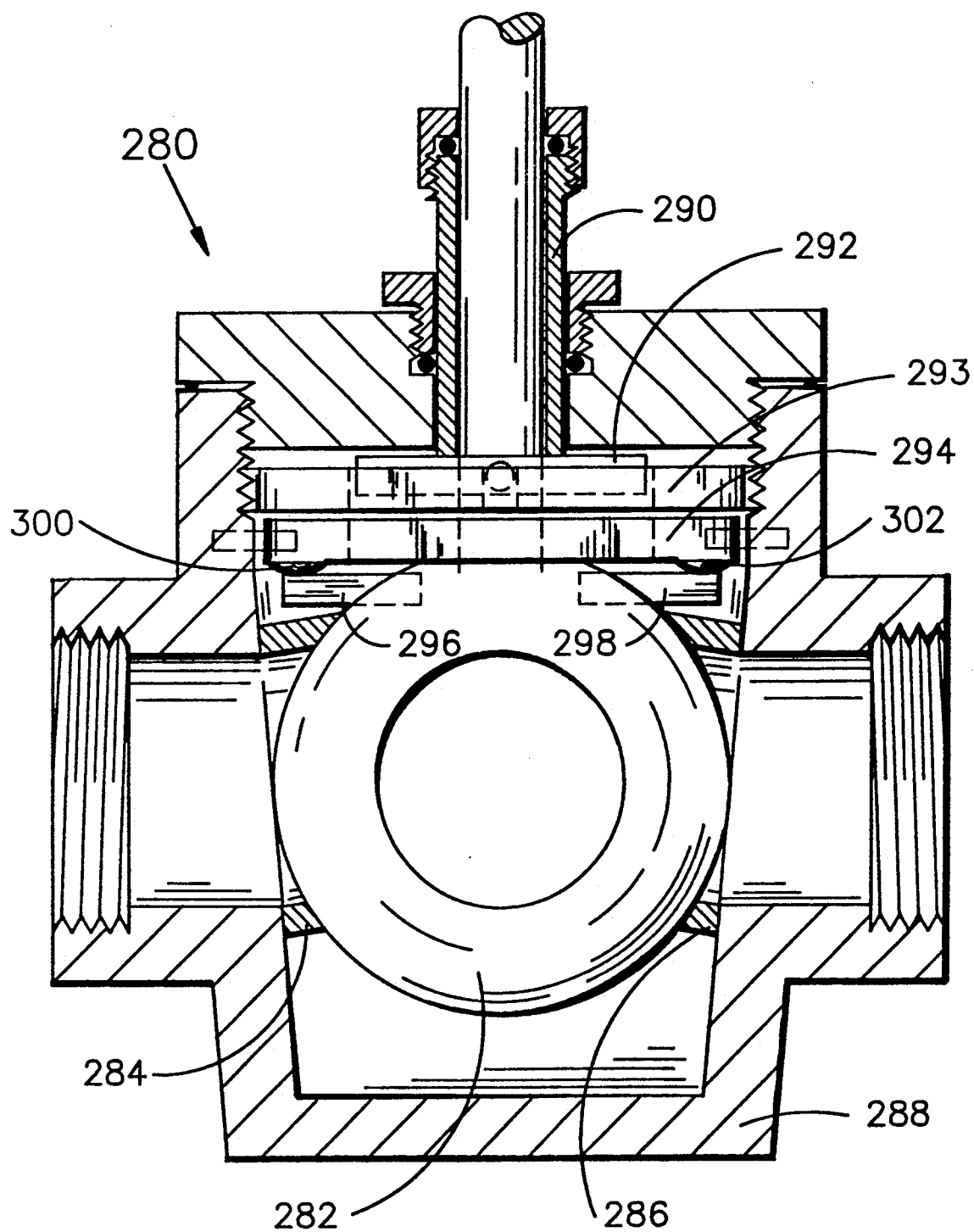
FIG. 21A is a sectional view of an alternate embodiment of the valve shown in FIG. 21 having a rotating member in the form of a ball.
Figure 21:
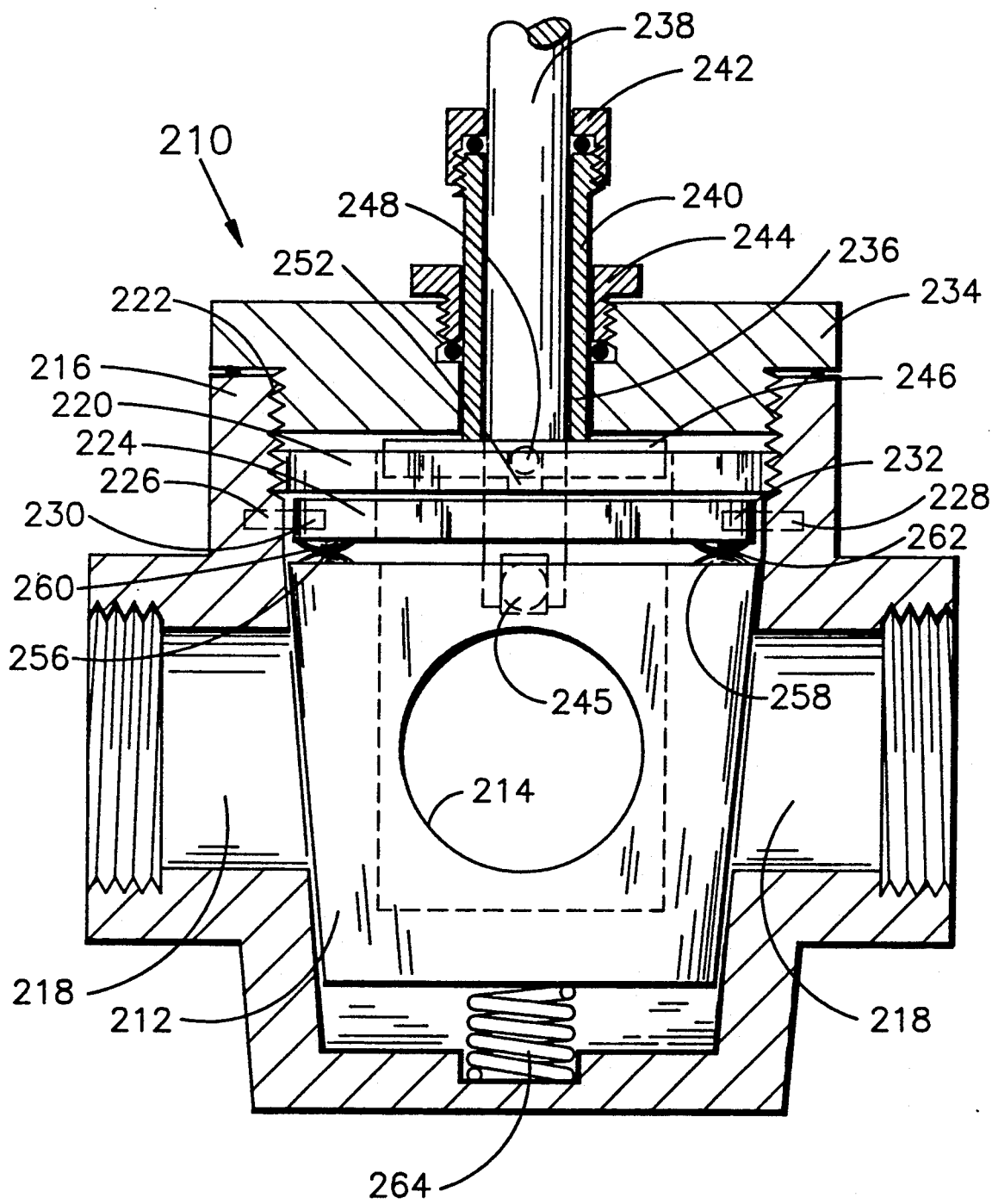
FIG. 21 is a sectional view of a further, third embodiment of the valve of this invention proving access to the checking mechanism without removing the valve from fluid pressure.

FIG. 21 illustrates another embodiment of the combination valve of this disclosure. Each of the various checking mechanisms previously described may also be readily employed in the valve of FIG. 21.

The valve 210 represents a conventional tapered plug valve. A tapered plug 212 having the shape of a frustum with a fluid passageway 214 is received in an appropriate valve body 216 that allows rotation of the plug 212 to align the fluid passageway 214 with a valve body fluid passageway 218 and thereby allow flow through the valve 210. Rotation of the plug 90 degrees will then place the fluid passageways 214 and 218 perpendicular to each other and flow through the valve 21 is prevented.

To achieve a tighter sealing force of the plug 212 against the valve body 216 when in the closed position, reduce the sealing force in all other positions, and provide an externally operable device to adjust the force, the valve 210 of FIG. 21 has been provided with an additional feature. An externally threaded annular disc 220 is received in a threaded valve body opening 222. Rotation thereby vertically displaces the disc 220. Beneath the disc 220 is a non-rotatable, vertically displaceable disc 224 which may also be annular in construction. A pair of opposing pins 226 and 228 are affixed in the valve body 216 and are slideably received in a pair of slots 230 and 232 in the disc 224, and the pins 226 and 228 thereby prevent rotation of, but allow the vertical displacement of, the disc 224. The valve body opening 222 receives a bonnet 234 which covers and seals the opening 222. The bonnet 234 has an internal opening 236. Received in the opening 236 are concentric control stems. A plug control stem 238 is concentrically received within a sealing force adjusting stem 240. Fluid leakage past the stems 238 and 240 is prevented by a packing nut 242 and a packing nut 244. The plug control stem 238 may be removably affixed to a removeable control pin 245 as shown. The bottom of the adjusting stem 240 is securely affixed to a disc 246 of a diameter slightly smaller than the inside diameter of the annular disc 220. The disc 246 is fitted with a pair of lugs or pins 248 and 250 which extend outwardly from the outside diameter of disc 246 and which are cooperably received in a pair of slots 252 and 254 in the inside diameter of the disc 220. The disc 22 and the disc 246 may be seen also in FIG. 27.

The user of the valve may adjust the force with which the plug 212 contacts the valve body 216 by rotation of the adjusting stem 240 with a suitable wrench or handle (not shown). Rotation of the adjusting stem 240 will thereby rotate the disc 246. The pins 248 and 250, as they also rotate, engage the slots 252 and 254 of the disc 220, which causes the disc to also rotate, which therefore will apply a downward force to disc 224. As disc 224 is in contact with the top of the plug 212, clockwise rotation of adjusting stem 240 increases the sealing force of the plug, and counter clockwise rotation of the adjusting stem will reduce such force.

As also shown in FIG. 21, the top of the plug is provided with a pair of protrusions 256 and 258 which cooperate with an opposing pair of protrusions 260 and 262 on the bottom side of the disc 224. As the disc 224 is non-rotatable, the protrusions 256 and 258 engage the protrusions 260 and 262 only when the valve is in the closed position which further increases the sealing force of the plug 212. This provides the feature of an increased sealing force only when it is needed, that is, in the closed position, and a reduced force in all other positions, providing for longer valve life and ease of operation by the reduction of sealing force. Additionally, a spring 264 may be employed to urge the plug slightly upwardly when the valve is rotated from a closed to an open position. When access to the interior of the plug 212 is desired, the valve is rotated to the closed position and the bonnet 234 is removed which allows the stems 238 and 240, and the disc 246, to be removed also. As disc 220 has remained stationary, the plug 212 has remained stationary and in sealed engagement with the valve body 216. As disc 220 and disc 224 are annular, whatever checking mechanism has been utilized in the plug 212 may be accessed and repaired or replaced.

FIG. 21A illustrates how the variable sealing force feature may be employed in a valve with a rotating member in the form of a ball. A valve 280 is comprised of the same components as the valve of FIG. 21, however the plug 212 has been replaced by a ball 282 positioned between a seat 284 and a seat 286. The seats 84 and 286 are inclined toward each other in a direction away from the top of the ball and are free to vertically slide within the valve body 288. An adjusting stem 290 rotates the disc 292 which rotates the disc 293 which may apply a downward force against the non-rotatable disc 294 as previously discussed. This allows the user of the valve to vary the force of the seal between the ball 82 and the seats 284 and 286, and the force of the seal between the seats 284 and 286 and the valve body 288. The ball 282 is provided with a pin 296 and a pin 298 which cooperate with a protrusion 300 and a protrusion 302 on the bottom side of the disc 294 in such a manner as to automatically increase the downward force applied to the ball 282 in the closed position, and to automatically decrease the force in any other position. Again, this provides a more fluid-tight seal when the valve is closed and reduces the wear and abrasion on the seats when the ball is rotated, providing for longer seal life and ease of operation.

Figure 27:
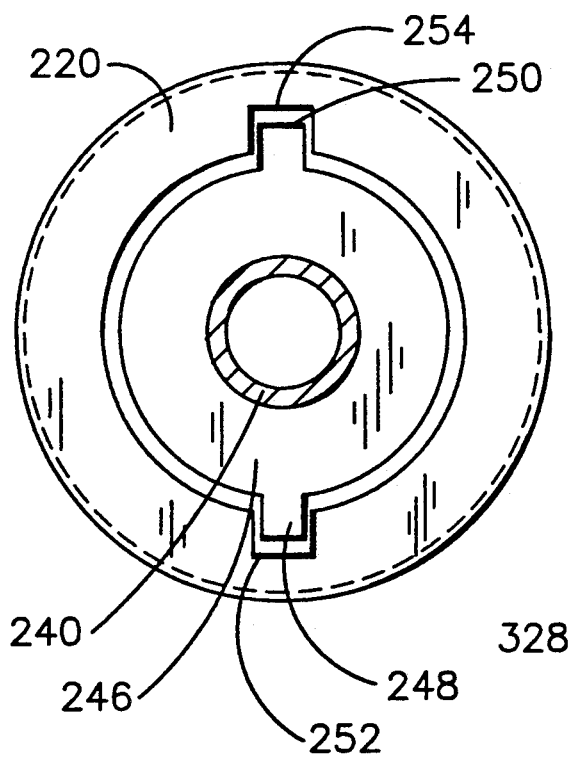
FIG. 27 is a top plan view of discs employed in FIGS. 21 and 21A.

FIG. 27 is a top plan view of the adjusting stem 240, the disc 246, and the pins 248 and 250 in cooperation with the disc 220 of FIG. 21.

Figure 26:
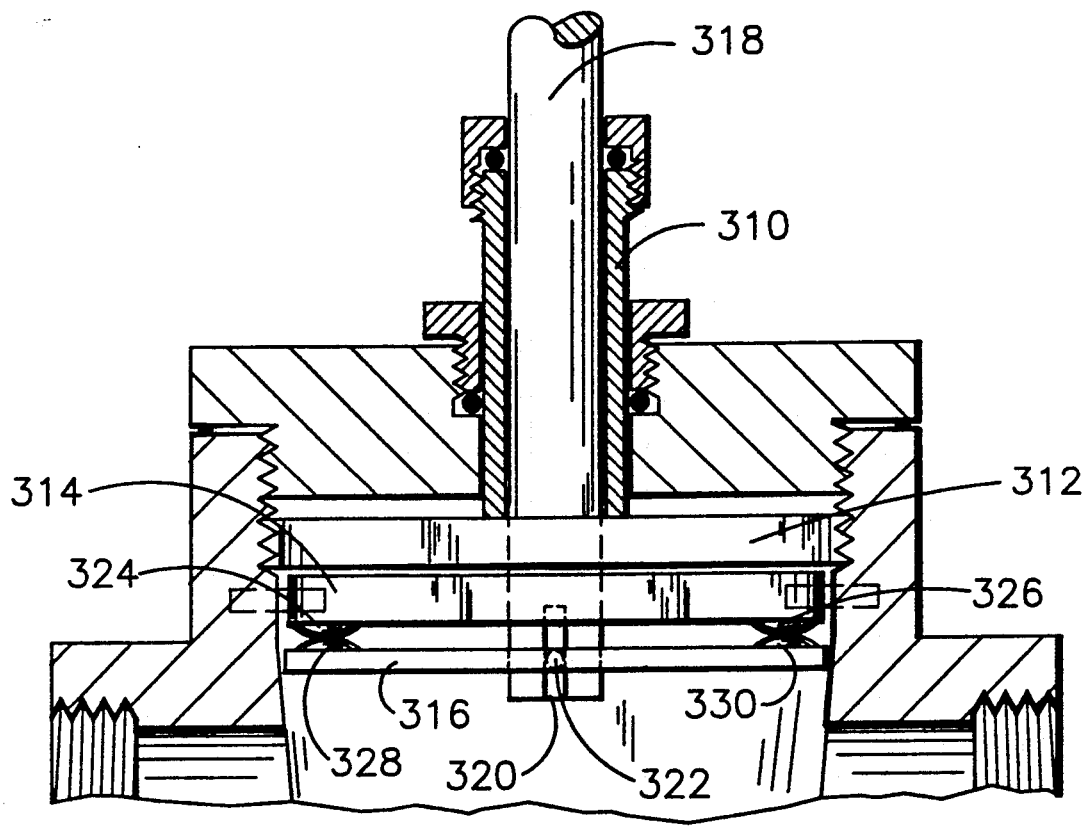
FIG. 26 is a sectional view of another embodiment of a variable sealing force mechanism for use with the valves in FIGS. 21 or 21A.

FIG. 26 illustrates another embodiment as may be readily employed in a valve of the type previously described. An adjusting stem 310 is securely affixed to an externally threaded disc 312. Clockwise rotation of the adjusting stem 310 will force the disc 312 downward which applies a downward force to a non-rotatable disc 314, which will therefore apply a downward force to a disc 316. The disc 316 may be above and in contact with either a ball or a plug rotating member. Therefore, the user may adjust the sealing force of the ball or plug employed by rotation of the adjusting stem 310. The disc 316 is slideably but non-rotatably affixed to a rotating member control stem 318 by means of a key slot 320 in the control stem 318 and a key 322 in the disc 316. The bottom surface of the non-rotatable disc 314 is provided with a pair of opposed protrusions 324 and 326 which cooperate with a pair of protrusions 328 and 330 on the top surface of the disc 316. Therefore, rotation of the stem 318, to open or close the valve, will rotate both the rotating member and the disc 316 so that when the valve is reaching a closed position, the protrusions 324 and 326 contact the protrusions 328 and 330, which will force the disc 316 down and thereby force the rotating member down, and thereby automatically increase the sealing force of the valve, again only in the closed position. As this embodiment utilizes the protrusions 328 and 330 of the disc 316 to automatically increase the sealing force in the closed position, the need for protrusions on a plug or pins on a ball is eliminated.

Figure 28:
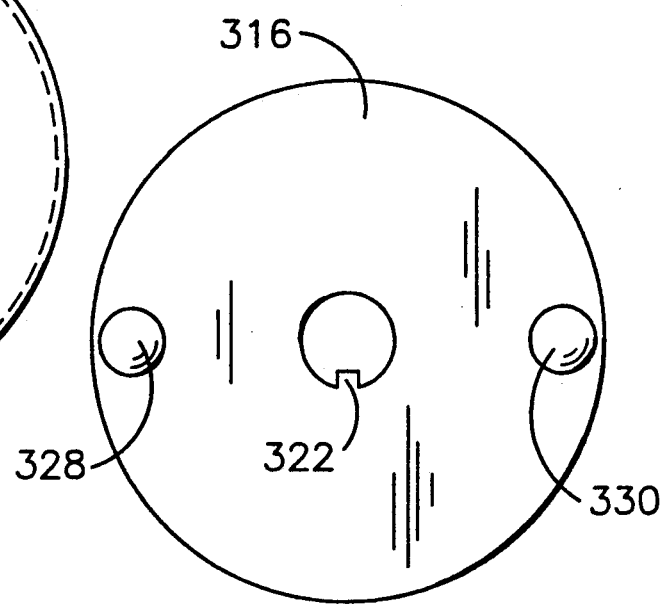
FIG. 28 is a top plan view of the rotating disc of FIG. 26.

FIG. 28 is a top plan view of the disc 316 of FIG. 26.

FIG. 29 illustrates the non-rotatable, vertically displaceable disc 224 of FIG. 21.

FIG. 30 discloses a non-rotatable, vertically displaceable disc 350 positioned within a valve body 352 above and in contact with the rotating member (not shown). A bonnet 354 is provided with an internal opening 356. The opening 356 of this embodiment is, however, provided with a threaded portion 358. An adjusting stem 360 is also provided with an externally threaded portion 362 which cooperates with the threaded portion 358 of the bonnet opening 356. Securely affixed to the bottom end of the adjusting stem 360 is a disc 364. A rotating member control stem 366 is concentrically received in the adjusting stem 360. The lower end of the control stem 366 is provided with a key slot 368. A disc 370 is slideably but non-rotatably affixed to the lower portion of the control stem 366. Rotation of the disc 370 about the control stem is prevented by a key 372 in the disc 370 which cooperates with the key slot 368. The disc 370 is also shown in FIG. 31. A spring 374 is compressed between the disc 364 and the disc 370. The spring 374 therefore applies a constant downward force to the disc 370, which therefore applies a downward force to the disc 350. As the disc 350 is above and in contact with the rotating member, the force exerted by the spring 374 maintains a constant force on the rotating member.

To adjust the sealing force, the user of the valve rotates the adjusting stem 360 which will, due to the threaded portions 358 and 362, cause vertical displacement of the stem 360 and thereby the disc 364. Downward displacement increases the force on the spring 374, which therefore increases the force on the sliding disc 370, thence the disc 350, and therefore the rotating member. Conversely, upward displacement reduces the force on the rotating member.

Rotation of the control stem 366 to open or close the valve also rotates the keyed disc 370. The bottom surface of the disc is provided with a protrusion 376 and a protrusion 378 which cooperate with a protrusion 380 and a protrusion 382 on the upper surface of the disc 350 when the valve is in the closed position as represented in FIG. 30. When the control stem 366 is rotated to open the valve, the disc 370 also rotates which ends the cooperation of the protrusions which therefore reduces the force applied to the rotating member, thereby allowing for easier operation and extended seal life. When rotating the control stem 366 to close the valve, the force exerted by the spring 374 is relatively minimal, which allows for ease of operation, and it is only when the valve begins to reach the closed position that the sealing force increases. When the valve has been closed, and should the user of the valve determine additional sealing force is required, the user need merely rotate the adjusting stem 360 to obtain the force required to effectively prohibit the flow of fluid. Should this required force be relatively great, as in the event of a worn plug or seats, opening the valve again would normally require great effort. However, the feature of an automatically decreased force shortly after opening rotation is initiated significantly reduces such required effort, and as the frictional forces are reduced, seal or plug wear is also lessened.

Figure 22:
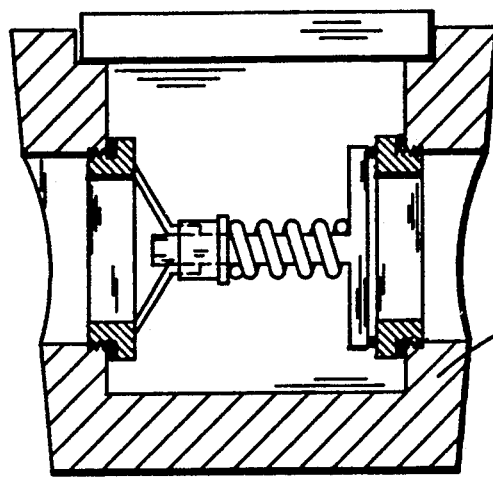
FIG. 22 is a partial sectional view of a rotating member having a checking mechanism in the form of a poppet arrangement for use with the valve shown in FIG. 21.

FIG. 22 illustrates how the valve of FIG. 21 may be provided with the checking mechanism of FIG. 19. As the plug 212 is maintained in the closed position, the bonnet (not shown) may be removed. The checking mechanism is now accessible through the opening. As the amount of force with which the plug engages the valve body is determined by the user of the valve, should the user determine, upon beginning to remove the bonnet, that the flow of fluid is not effectively stopped, the user need only tighten the adjusting stem until the flow is stopped. Thence, the user may proceed to repair or replace the checking mechanism.

Figure 23:
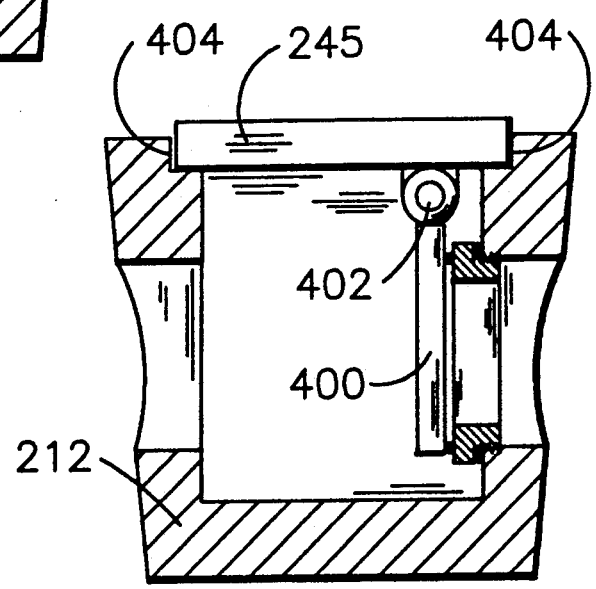
FIG. 23 is a partial sectional view of a rotating member having a checking mechanism in the form of a clapper arrangement for use with the valve shown in FIG. 21.

FIG. 23 illustrates a plug 212 provided with a clapper 400 as the checking device. The clapper 400 is pivotally mounted to a pin 402. The pin is supported at each end by grooves formed in the top of the plug 212. The plug control pin 245 is removably positioned in the slots 404 and may rest on the top of the pin, as shown in FIG. 24.

Figure 25:
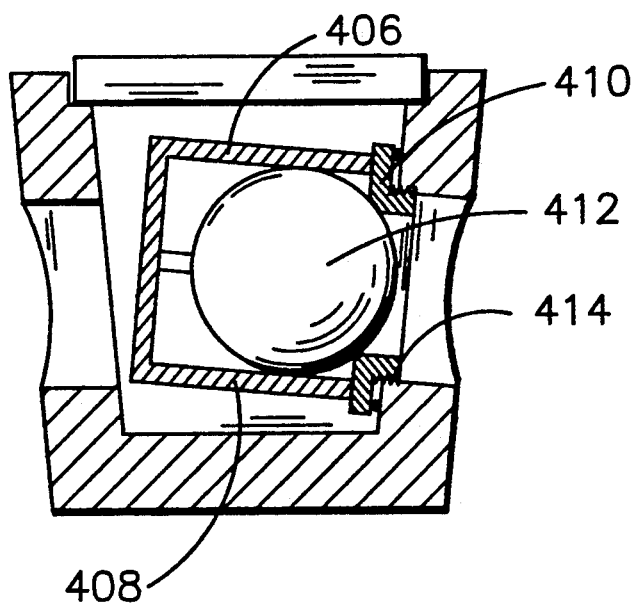
FIG. 25 is a partial sectional view of a rotating member having a checking mechanism in the form of a ball and seat arrangement for use with the valve shown in FIG. 21.

FIG. 25 illustrates a plug suitable for use in the valve of FIG. 21 provided with a checking device comprised of a checking ball and seat. A valve assembly 406 comprised of a cage 408 removably affixed to a seat 410 and a ball 412 is provided therein. The seat 410 is provided with external threads 414 which may be threadably secured in a threaded portion of the fluid passageway. The checking device is accessible in the same manner as previously described, thereby allowing the valve assembly 406 to be removed from the threaded portion of the fluid passageway.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A combination valve comprising:
   a valve body having a flow passageway therethrough and means to connect other fluid flow members thereto with such passageway, the body having an opening in the top thereof communicating with said passageway;

a rotating member rotatably received in said body said rotating member having a flow passageway therethrough which is alignable with the body flow passageway by rotatably positioning the member with said body passageway, the rotating member having a top opening therein communicating with said passageway therethrough;

a checking means within said rotating member and movable between a closed position blocking said passageway therethrough and an open position opening said passageway therethrough;

a bonnet member removably closing said body top opening and having a smaller diameter opening therethrough;

stem means rotatably received in said bonnet member and affixed within said valve body to said rotating member;

means external of said valve body to rotate said stem means and thereby said rotating member, whereby said member may be rotated to a first position to align the said passageway therethrough with said passageway through said valve body to permit the flow of fluid in one direction, said checking mechanism blocking fluid flow in the opposite direction, and said rotating member may be rotated to a second position to align the said passageway therethrough with said passageway through said valve body to permit the flow of fluid in the opposite direction, said checking mechanism blocking counter fluid flow, and rotated to a third position wherein said passageway therethrough is out of alignment with said passageway through said body to block fluid flow in either direction through said body, and wherein in said third position, said bonnet may be removed to expose said rotating member and to permit access to said checking mechanism.

2. A combination valve as set forth in claim 1 including a first and second valve seat in said body, each seat having a flow passageway therethrough, the seats being spaced apart and the flow passageways therethrough being in communication with said valve body flow passageway.

3. 2. A combination valve as set forth in claim 1 wherein said checking means includes a poppet valve extending from a stem and spring means to block said rotating member passageway.

4. 3. A combination valve as set forth in claim 1 wherein said checking means includes a checking ball which is urged toward a seat by spring means to block said rotating member passageway.

5. A combination valve as set forth in claim 1 wherein said checking means includes a checking ball juxtaposed and movable between seats in said rotating member to block said rotating member passageway.

6. A combination valve according to claim 1 including:
top seal means juxtaposed between said rotating member and said bonnet member.

7. A combination valve according to claim 6 including means of displacing said rotating member in the direction towards said top seal means when said member is rotated to said third, fully closed position.

8. A combination valve according to claim 6 wherein said bonnet member includes an outer bonnet member having a large diameter threaded opening therethrough, and an inner bonnet member having a threaded external cylindrical surface threadably received in said outer bonnet member, said inner bonnet member having said stem means therein, and wherein said top seal means includes an annular member, having a large diameter opening therein in register with said large diameter opening in said top of said rotating member whereby said inner bonnet member may be removed to allow access to the said checking mechanism within said rotating member.

9. A combination valve according to claim 2 wherein said first and second valve seats are inclined toward each other in the direction away from said body top opening and including means of applying force against the top of said rotating member to thereby force said rotating member into increased force of contact with said valve seats.

10. A combination valve according to claim 9 wherein said valve seats are free to slide against the interior of said valve body in response to increased force applied against the top of said rotating member.

11. A combination valve according to claim 8 including means to permit longitudinal displacement, but to prevent the rotation of said top seal means when said outer bonnet member is rotatably threaded onto said body.

12. A combination valve according to claim 7 wherein said rotating member is spherical and said means of displacing said rotating member in the direction towards said top seal means when said rotating member is rotated to said third, fully closed position includes an arcuate slot formed in the bottom of said rotating member and a trunnion member extending vertically upwardly from the interior bottom of the valve body, the trunnion being of rectangular cross-sectional configuration taken in a horizontal plane, the length of the rectangular cross-sectioned trunnion being less than the width of said arcuate slot, said trunnion being received in said arcuate slot.

* * * * *